(12) United States Patent
Thommandru et al.

(10) Patent No.: US 10,694,056 B1
(45) Date of Patent: Jun. 23, 2020

(54) METHODS AND SYSTEMS FOR RESOLVING ONE OR MORE PROBLEMS RELATED TO A MULTI-FUNCTION DEVICE VIA A LOCAL USER INTERFACE

(71) Applicant: XEROX CORPORATION, Norwalk, CT (US)

(72) Inventors: Maharshi Thommandru, Nallajerla mandal (IN); Ashok Jason Vedaraj, Chennai (IN); Zakirahmed Shaik, Nellore (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 16/386,313

(22) Filed: Apr. 17, 2019

(51) Int. Cl.
*H04N 1/00* (2006.01)
*H04L 29/06* (2006.01)

(52) U.S. Cl.
CPC ....... *H04N 1/00464* (2013.01); *H04L 63/083* (2013.01); *H04N 1/00042* (2013.01); *H04N 1/00079* (2013.01); *H04N 1/00411* (2013.01); *H04N 1/00514* (2013.01)

(58) Field of Classification Search
CPC ........... H04N 1/00464; H04N 1/00079; H04N 1/00411; H04N 1/00042; H04N 1/00514; H04L 63/083
See application file for complete search history.

(56) References Cited

U.S. PATENT DOCUMENTS

| | | | | |
|---|---|---|---|---|
| 2011/0222102 A1* | 9/2011 | Ito | ...... | H04N 1/00204 358/1.14 |
| 2011/0299116 A1* | 12/2011 | Hibino | ...... | G06F 3/1204 358/1.15 |
| 2016/0373460 A1* | 12/2016 | Itoh | ...... | H04L 67/02 |
| 2017/0264779 A1* | 9/2017 | Hirahara | ...... | H04N 1/32539 |

* cited by examiner

*Primary Examiner* — Neil R Mclean

(57) ABSTRACT

The disclosure discloses methods and systems for enabling an administrator to resolve problems related to a multi-function device, via a local user interface (LUI) of the multi-function device (MFD). The method includes sending a notification message to the administrator about a problem related to a service of the MFD. The MFD receives login credentials at the LUI from the administrator to access the MFD. The MFD displays an error message about the problem to the administrator on the LUI based on the login credentials. Based on an input received from the administrator on the LUI, the MFD retrieves at least one relevant webpage corresponding to the problem and displays the at least one relevant webpage to the administrator via the LUI. The MFD receives setting inputs and updates settings on the at least one relevant webpage based on the setting inputs such that the problem is resolved.

22 Claims, 12 Drawing Sheets

METHODS AND SYSTEMS FOR RESOLVING ONE OR MORE PROBLEMS RELATED TO A MULTI-FUNCTION DEVICE VIA A LOCAL USER INTERFACE

TECHNICAL FIELD

The presently disclosed subject matter relates to the field of multi-function devices, and more particularly, to methods and systems for enabling an administrator to resolve one or more problems related to a multi-function device via a local user interface.

BACKGROUND

Multi-function devices (MFDs), are very common these days and are frequently used by people in their offices, homes for printing, scanning, photocopying, and so forth. While installation of the multi-function devices, the devices need to be configured to work as per business/individual needs. Currently, when there is a problem in the multi-function device (or) some settings need to be changed or updated, an administrator can update the settings either through an internet services program such as CentreWare Internet Services (CWIS) or through a local user interface (LUI), separately. The Internet Services Program is a web-based program that allows the administrator and/or users to configure the MFD using any supported browser that is available in a computing device like a personal computer or any other supported devices. The LUI is a local user interface of the MFD including one or more services displayed for users as per the settings configured in the Internet Services Program. The Internet Services Program has almost 70% administrative options of configuration settings of the MFD integrated in it, which is either unique or a one place settings, 20% of the configuration settings can be done through both Internet Services Program and LUI, and 10% of the configuration settings are LUI specific only, for example, diagnostic options.

If the settings need to be done at the LUI, then the administrator accesses the MFD directly or uses the personal computer to access the LUI through a remote desktop. Through the LUI, very limited settings can be done or changed such as diagnostic options. If setting needs to be done through the Internet Services Program, then the administrator has to go back to the personal computer and do the settings. Post this, the administrator has to go back to access the LUI again at the MFD or via the remote desktop to confirm the settings or check whether the service has started working.

As an example, if a user is unable to access email service and DNS is not set, then to fix this problem, the administrator may be required to access the Internet Services Program using the personal computer to make necessary changes and then accesses the LUI on the MFD to check that changes are done successfully and the email service is working fine for the user. This may be time consuming and tedious for the administrator. Hence, in light of the limitations, there arises a need for improved methods and systems for enabling an administrator to resolve the reported problem without any to and fro between the multi-function device and the computing device and additionally arises a need for hassle free solution.

SUMMARY

According to aspects illustrated herein, there is provided a method for enabling an administrator to resolve one or more problems related to a multi-function device, via a local user interface (LUI) of the multi-function device (MFD). The multi-function device implements an Internet Services Program through the local user interface, the Internet Service Program includes a plurality of webpages. The method includes sending, by a notification module, a notification message to the administrator about a problem related to a service of the multi-function device. The method further includes receiving, by a network controller, one or more login credentials from the administrator to access the multi-function device through the local user interface. Based on an authentication of the administrator, an error message about the problem is displayed to the administrator on the local user interface. Based on an input received from the administrator on the local user interface, at least one relevant webpage of the Internet Services Program corresponding to the problem is automatically retrieved by the network controller. Then, the at least one relevant webpage of the Internet Services Program is displayed, by the network controller, to the administrator via the local user interface. Thereafter, one or more setting inputs are received on the at least one relevant webpage of the Internet Services Program from the administrator to resolve the problem related to the service of the multi-function device. Then, the at least one relevant webpage of the Internet Services Program is updated, by the network controller, based on the one or more setting inputs such that the service of the multi-function device is functional.

According to other aspects illustrated herein, there is provided a multi-function device (MFD) for enabling an administrator to resolve one or more problems related to the multi-function device, via a local user interface (LUI) of the multi-function device. The multi-function device includes a notification module to send a notification message to the administrator about a problem related to a service of the multi-function device. The multi-function device further includes a network controller to receive one or more login credentials from the administrator, to access the multi-function device through the local user interface. Based on an authentication of the administrator, the network controller displays an error message about the problem to the administrator on the local user interface. The network controller then automatically retrieves at least one relevant webpage corresponding to the problem based on an input received from the administrator through the local user interface. The network controller receives one or more setting inputs on the at least one relevant webpage from the administrator to resolve the problem. The network controller updates the at least one relevant webpage based on the one or more setting inputs such that the service of the multi-function device is functional or resolved. The multi-function device further includes the local user interface to display the at least one relevant webpage to the administrator.

According to additional aspects illustrated herein, there is provided a system including a multi-function device (MFD). The multi-function device sends a notification message to an administrator about a problem related to a service of the multi-function device. The multi-function device receives one or more login credentials from the administrator, to access a local user interface (LUI) of the multi-function device. The multi-function device displays an error message about the problem to the administrator on the local user interface based on an authentication of the administrator. The multi-function device automatically retrieves at least one relevant webpage corresponding to the problem based on an input received from the administrator on the local user interface. The administrator provides the input via one or more swipe options displayed on the local user interface.

The multi-function device displays the at least one relevant webpage to the administrator via the local user interface. The multi-function device receives one or more setting inputs on the at least one relevant webpage from the administrator to resolve the problem. The multi-function device finally updates the at least one relevant webpage based on the one or more setting inputs. The multi-function device stores the updated at least one relevant webpage.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1A:
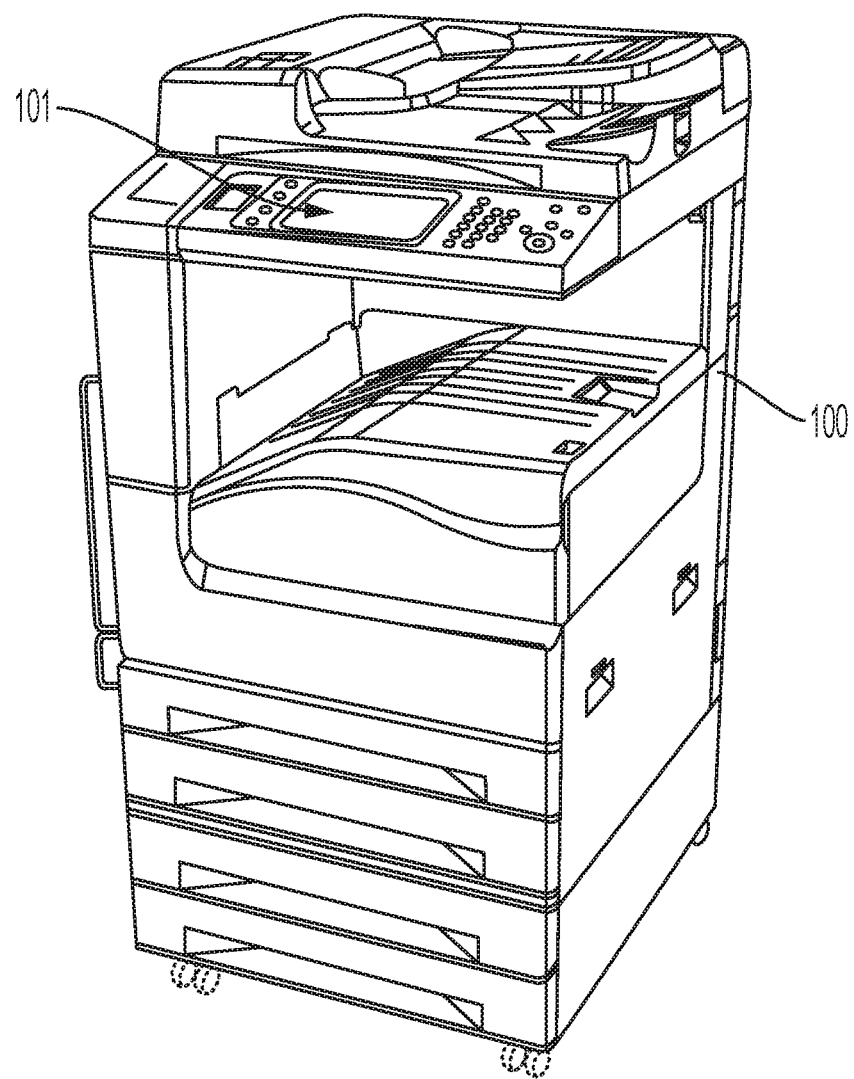
FIG. 1A illustrates an exemplary physical multi-function device, in accordance with various embodiments of the present disclosure.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples than just provided below.

A "multi-function device" is a single device or a combination of multiple devices to perform more than one function such as, but not limited to, scanning, printing, cutting, imaging, and so forth. The multi-function device may include software, hardware, firmware, and combination thereof. In the context of the current disclosure, the multi-function device (MFD) enables or allows an administrator to resolve one or more problems related to a service by accessing webpages through a local user interface of the multi-function device. The administrator is enabled to do so by automatically fetching/retrieving and presenting a relevant webpage to the administrator via the local user interface.

An "administrator" refers to an authorized person who has administrator rights in an organization such as to access and to fix the one or more problems related to the multi-function device. In the context of the present disclosure, the administrator resolves the one or more problems related to the multi-function device by providing one or more setting inputs on the relevant webpage, through the local user interface.

A "user" refers to any user who accesses and/or uses one or more services of the multi-function device such as email, printing, scanning, copying, workflow and so on.

The term "problem" includes any errors being faced by the user when accessing the multi-function device or its services. The problem relates to any services of the multi-function device. For example, the problem may be when the user is unable to access an email service, unable to use a scan service and so on.

The "local user interface" (LUI) refers to a user interface of the multi-function device to access one or more services of the multi-function device. The user or the administrator can access the LUI. In context of the present disclosure, the administrator uses the local user interface to resolve the problems related to the multi-function device.

A "relevant webpage" refers to a webpage of Internet Services Program corresponding to a problem associated with a service of the multi-function device. The webpage includes one or more parameters or settings related to the service.

The term "Internet Services Program" refers to a web-based program that allows the administrator to configure the multi-function device using any supported browser that is available in an associated computing device or any other supported devices. A non-limiting example of the Internet Services Program includes a CentreWare Internet Services (CWIS). In context of the present disclosure, the Internet Services Program is implemented in the multi-function device. The Internet Services Program includes a number of webpages, where each webpage may include a number of settings, or a number of parameters. The administrator as required can update the settings and/or parameters.

Overview

Internet Services Program is a web-based platform, which enables an administrator to configure a multi-function device and allows the administrator to resolve any problems related to the multi-function device. The Internet Services Program includes multiple webpages related to various services of the multi-function device. Each webpage includes several settings which need to be provided such that the services work. Some services may have multiple webpages while some services may have a single webpage of the Internet Services Program. Generally, when a problem arises with the multi-function device or any of its services, the administrator accesses any browser available in his/her personal computing device and accesses different webpages to resolve the problem of the multi-function device. The administrator needs to browse multiple webpages to find the relevant webpage to resolve a particular problem reported by a user. Most of the resolutions of the problems can only be provided by accessing the Internet Services Program (70%) and corresponding webpages. A very few resolutions can be provided through the local user interface (10%) and the rest can be provided both through the Internet Services Program and the local user interface (20%). Here, the Internet Services Program plays a very important role, but the administrator always needs to access a computing device or a different device to access the Internet Services Program and further the administrator has to browse through multiple webpages to find the relevant webpage. The administrator updates some settings on the webpage to resolve the problem. In addition, the administrator requires accessing the local user interface to validate or confirm whether the problem is resolved. The administrator has to switch between two different devices, i.e., multi-function device and computing device. This consumes a lot of time and the entire process is inefficient in nature and in view of this, the present disclosure is submitted.

The present disclosure implements Internet Services Program in a multi-function device such that an administrator can directly access the Internet Services Program and corresponding webpages via a local user interface of the multi-function device to resolve a problem at the multi-function device. As a result, the administrator does not require access to any computing device or a separate device to resolve any problem related to the multi-function device. The present disclosure further automatically fetches and presents a relevant webpage corresponding to a problem to the administrator through the local user interface such that the administrator can directly access the displayed webpage through the local user interface to resolve the problem. As a result, the administrator does not require browsing through multiple webpages to find the relevant webpage. Moreover, the administrator does not require log in again to the Internet Services Program as log-in to the multi-function device is considered to login into the Internet Services Program. As the administrator accesses the local user interface for error message and for validation, and accesses the Internet Service Program through the local user interface, thus, the administrator can easily switch between the local user interface and the Internet Services Program (or webpages of the Internet Services Program). As a result, the administrator accesses a single device for resolving the problem and for validating whether the problem is resolved.

The present disclosure discloses systems and methods for resolving one or more problems related to service of a multi-function device through a local user interface. The methods and systems implement Internet Services Program such as CWIS through the local user interface for resolving the problems related to the multi-function device. The methods and systems automatically fetch and present at least one relevant webpage through the local user interface when a problem is reported. An administrator accesses the displayed relevant webpage to update one or more settings on the relevant webpage. In this manner, the methods and systems enable the administrator to access the Internet Services Program for any reported problem through the local user interface. The administrator is able to access the webpage related to the problem, which is active on the multi-function device. In this way, the multi-function device enables the administrator to resolve all problems related to the multi-function device directly at the multi-function device (i.e., without requiring any computing device).

The present disclosure focuses on automatically fetching relevant webpages to the local user interface for quick or hassle free support to the administrator. The administrator is directly given the relevant web page for the problem when he addresses any problem from the local user interface.

Exemplary Physical Multi-Function Device

FIG. 1A illustrates an exemplary physical multi-function device 100 according to an embodiment of the present disclosure. The multi-function device 100 may be used by a number of users for one or more services such as email, scan, workflows, copy print, fax, or the like. As shown, the multi-function device 100 is a single device but the multi-function device 100 may be a combination of multiple devices without limiting the scope of the disclosure. The multi-function device 100 may include software, hardware, firmware, or a combination thereof.

Figure 1B:
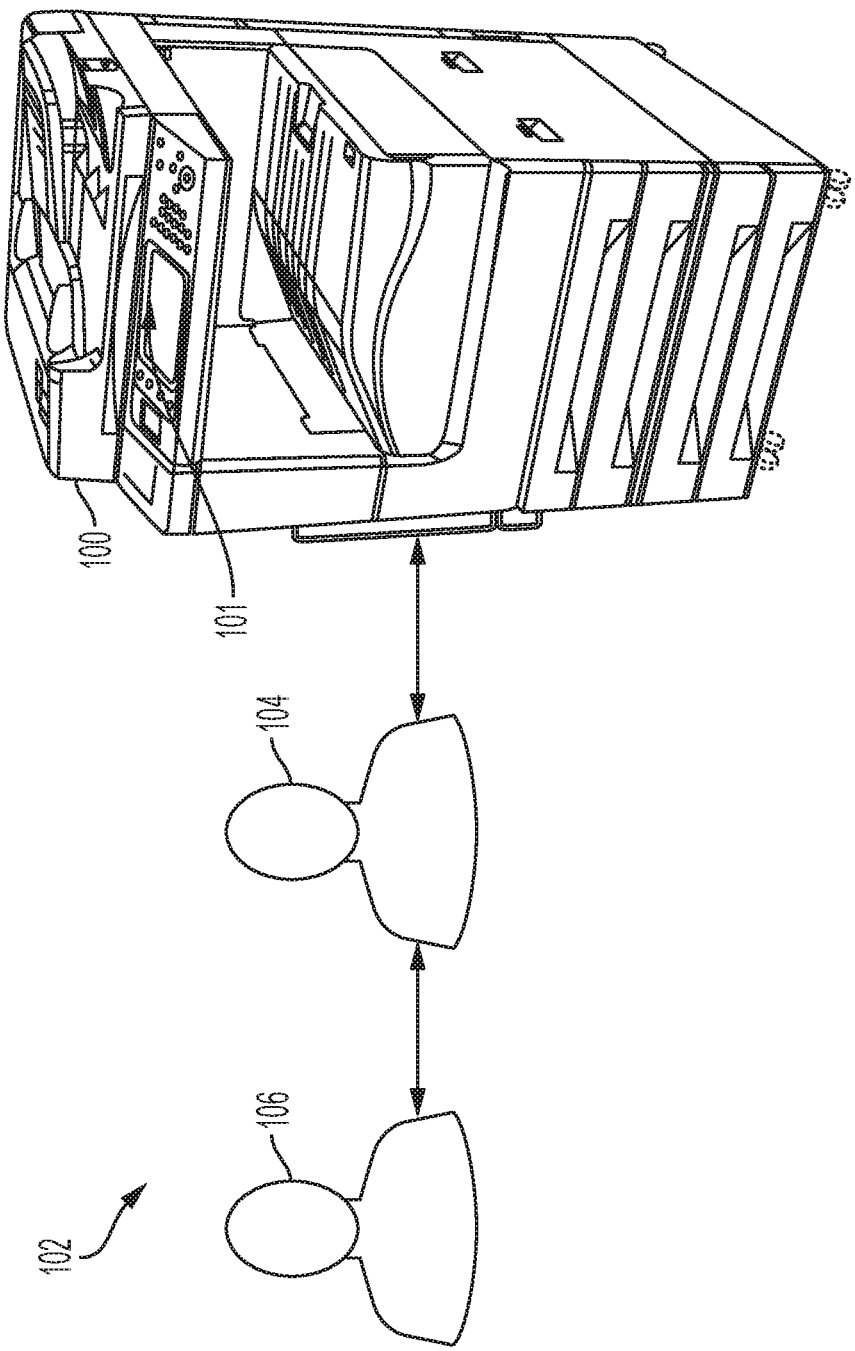
FIG. 1B illustrates an exemplary environment including the multi-function device of FIG. 1A, a user and an administrator, where various embodiments of the present disclosure can be practiced.

The multi-function device 100 offers a number of services such as email, print, scan, copy, or the like. A user (106 as shown in FIG. 1B) accesses any of the services through a local user interface 101 for his day-to-day work. Similarly, an administrator (104 of FIG. 1B) accesses the services through the local user interface 101. The administrator (104 of FIG. 1B) accesses the services to see whether the services are functioning appropriately (i.e., without any error).

The multi-function device 100 implements Internet Services Program, where the Internet Services Program includes all webpages related to services of the multi-function device 100. A non-limiting example of the Internet Services Program is a CentreWare Internet Services (CWIS). Each service has one or more webpages where various settings or parameters are included for functioning of the particular service at the multi-function device 100. The Internet Services Program and corresponding webpages are stored at the multi-function device 100. When a problem related to a service is reported, the multi-function device 100 automatically identifies, fetches and displays one or more relevant webpages of the Internet Services Program via a local user interface 101 of the multi-function device 100. This way, the administrator (104 of FIG. 1B) is not required to search for relevant webpages(s) related to the problem. The administrator (104 of FIG. 1B) provides one or more setting inputs and updates one or more settings on the relevant webpages in order to resolve the reported problem. The multi-function device 100 displays relevant webpages related to the problem that is active on the multi-function device 100. In this manner, the multi-function device 100 provides a quick resolution of problems at the multi-function device 100.

For better understanding, some terms are explained. Access to the multi-function device 100 includes access to a local user interface 101 of the multi-function device 100. Further, login to the multi-function device 100 includes login to the local user interface 101 of the multi-function device 100. When a webpage is referred, it is a webpage of the Internet Services Program, which is implemented at the multi-function device 100. When a problem is referred, it indicates a problem related to any service of the multi-function device 100 or any problem related to the multi-function device 100. When a relevant webpage is referred, it includes a webpage of the Internet Services Program corresponding to a particular problem reported by a user. An error message represents a part of the local user interface 101, but a webpage represents a part of the Internet Services Program running at the multi-function device 100.

FIG. 1B illustrates an exemplary environment 102 including the multi-function device 100 of the FIG. 1A, where various embodiments of the present disclosure can be practiced. The environment 102 includes an administrator 104, a user 106, and the multi-function device 100. The administrator 104 is an authorized user who has administrative rights such as configuring the multi-function device 100, providing one or more settings initially at the time of configuring the multi-function device 100, updating one or more settings in case of a reported problem, etc. The user 106 is an authorized user who uses the services of the multi-function device 100 or the multi-function device 100 for his day-to-day tasks. The multi-function device 100 includes a local user interface 101 that enables any user such as the administrator 104 or the user 106 to access one or more services or functions of the multi-function device 100. The local user interface 101 represents a user interface displaying one or more services to the user 106 or to the administrator 104. The local user interface 101 further displays notifications such as error messages, or other notification messages to the user 106 or to the administrator 104. These are few examples, the local user interface 101 can be used for other purpose. In the context of the current disclosure, the multi-function device 100 enables the administrator 104 to access webpages of the Internet Services Program directly via the local user interface 101 of the multi-function device 100.

Internet Services Program is a platform through which the administrator 104 can do configuration settings or can change settings at later stages, for example, when a problem arises with a service of the multi-function device 100. The administrator 104 does the configuration settings initially at the time of configuring the multi-function device 100 or service at the multi-function device 100. At the time of configuring, the administrator 104 provides settings such that services at the multi-function device 100 work. Later the administrator 104 can update the settings as per the requirement of an organization or when any problem arises with the services of the multi-function device 100. The Internet Services Program has almost 70% of configuration settings within itself, which is either unique or a one place settings. The administrator 104 can change some of the settings via the Internet Services Program, some settings via the local user interface 101 of the multi-function device 100, and some by both, i.e., the Internet Services Program and the local user interface 101. Settings through the local user interface 101 are different settings than through the Internet Services Program. Settings through the local interface is minimal. Few examples of the Internet Services Program specific settings may include, but not limited to, creating a scan template, deleting address book contacts or groups, configuring email/Internet Fax, choosing and configuring authentication methods, user permission settings and so on. Few examples of the settings that can be done both, through the local user interface 101 and the Internet Services Program may be, but not limited to, accounting methods, modification of contacts in address book, choosing default settings for copy/id card copy and other features. An example of the local user interface specific setting may be any diagnostic options.

As shown, the user 106 uses the multi-function device 100 for the one or more services like email, scan, print, etc. While using the multi-function device 100, the user 106 may face a problem related to a service such as an email service. The user 106 reports the problem to the administrator 104 through the local user interface 101 of the multi-function device 100. Earlier, the problem used to be resolved through Internet Services Program which is running at a computing device. But in context of the present disclosure, the reported problem is resolved through the Internet Services Program which is implemented at the multi-function device 100 or through the local user interface 101 of the multi-function device 100. The multi-function device 100 notifies the reported problem to the administrator 104, the administrator 104 logs in into the multi-function device 100 and views the problem related screen on the local user interface 101. The administrator 104 provides an input via the local user interface 101. The input may be a touch input, an audio input, and so forth. Based on the input, the multi-function device 100 automatically identifies/searches for and fetches at least one relevant webpage related to the problem from the Internet Services Program and displays the at least one identified relevant webpage to the administrator 104. The administrator 104 accesses the at least one relevant webpage and updates one or more settings on the at least one relevant webpage to resolve the problem. The webpage with the updated settings is then stored with the multi-function device 100.

In some implementations, a single relevant webpage is retrieved and displayed to the administrator 104. While in other implementations, more than one relevant webpage is retrieved and displayed to the administrator 104. In such cases, administrator 104 may be required to provide/change setting inputs on more than one relevant webpage to fix the reported problem. The administrator 104 continue updating the settings on multiple relevant webpages until the problem is resolved completely and the service starts working fine (i.e., without any error).

In some implementations, the webpages are displayed at the local user interface 101 using a suitable browser such as, a web browser of Extensible Interface Platform (EIP).

In some implementations, the administrator 104 may fix more than one problem related to same or different services of the multi-function device 100 in a single logged-in session (i.e., without requiring the administrator 104 to login again to the multi-function device 100).

In an example, it is considered that the user 106 using an email service of the multi-function device 100 reports a problem related to the email service. The administrator 104 logs in into the local user interface 101 and an error pop-up is shown in the local user interface 101. The administrator 104 views the error pop-up and provides a touch input via the local user interface 101 in any direction such as up to down, down to up, left to right or right to left. Based on the input from the administrator 104, the multi-function device 100 initiates or launches the Internet Services Program in the background and provides access to the Internet Services Program in the local user interface. A DNS setting webpage is fetched from the Internet Services Program and displayed to the administrator 104 through the local user interface 101 itself. The administrator 104 accesses the DNS setting webpage, reviews the settings immediately and do the relevant changes to settings to fix the problem, without having to go back to a computing device. Once fixed, the administrator 104 validates the same in the local user interface 101 with a single logged-in session. For example, the administrator 104 accesses the email service and checks whether the email service is working without any error. Upon validation, the administrator 104 notifies the user 106 through the local user interface 101 or other ways.

In another example, it is considered that the user 106 requires to add or delete a contact in/from an address book of the multi-function device 100. The user 106 notifies the administrator 104 about the same. Upon receiving the notification, the administrator 104 logs in into the local user interface 101 by providing login credentials and an error message is shown in the local user interface 101. The administrator 104 views the error message and provides an input via the local user interface 101 in any direction such as up to down, down to up, left to right or right to left. Based on the input from the administrator 104, the multi-function device 100 initiates the Internet Services Program in the background. An Address Book webpage is fetched from the Internet Services Program and displayed to the administrator 104 through the local user interface 101 itself. The administrator 104 accesses the address book webpage, reviews the settings immediately and do the relevant changes to settings to fix the problem, without having to go back to any external computing device. The administrator 104 can easily delete/modify existing contacts as requested by the user 106. Once done, the administrator 104 validates the same in the local user interface 101 with a single logged-in session. For example, the administrator 104 accesses the address book and checks whether the requested contacts are modified or deleted.

In further example, it is considered that the user 106 reports a problem with a Scan Template. The administrator 104 logs in into the multi-function device 100. The administrator 104 accesses the user template from Workflow Scanning, and side swipes the screen. Upon receiving the swipe input, the multi-function device 100 authenticates the administrator in the Internet Services Program. Upon successful validation, the multi-function device 100 brings the template settings webpage from the Internet Services Program in the local user interface 101 itself. The administrator 104 makes the desired changes to the settings to fix the problem and validates the changes through the local user interface 101. In this way, the multi-function device 100 allows the administrator 104 to access the service through the local user interface 101 to validate the problem related to the service is resolved.

For example, the administrator 104 accesses the service again, and sees whether the problem is resolved successfully. If not, the administrator 104 may swipe to other webpages of the problem using any of the four options and update more settings until the problem of the multi-function device 100 is resolved successfully. Thereafter, the administrator 104 informs the user 106 to perform his work on the multi-function device 100. The user 106 logs in and accesses the service and can complete his/her work without any issue. The administrator 104 may log out of the multi-function device 100 after resolving the problem. In this way, the administrator 104 switches between the local user interface 101 and webpages of the Internet Services Program. For example, the administrator 104 switches between the local user interface 101 and the webpages of the Internet Services, by just swiping backwards to make the webpages go away and the local user interface 101 screen to show up.

When implementing the current disclosure, the administrator 104 is directly provided with the relevant webpages of the Internet Services Program corresponding to a problem through the local user interface 101 of the multi-function device 100. And implementing the present disclosure does not require the administrator 104 to navigating through different webpages in the Internet Services Program to search for the relevant page to change/update any settings. Moreover, the administrator 104 does not require to login again into the Internet Services Program as his credentials for log in into the multi-function device 100 provided before are used for authenticating the administrator 104 in the Internet Services Program. The administrator 104 accesses and checks the service via the local user interface 101 to confirm if the problem is resolved.

In all, the present disclosure provides a quick and hassle free support for the administrator 104 to resolve the problem of the multi-function device 100.

Exemplary Snapshots

Figure 2:
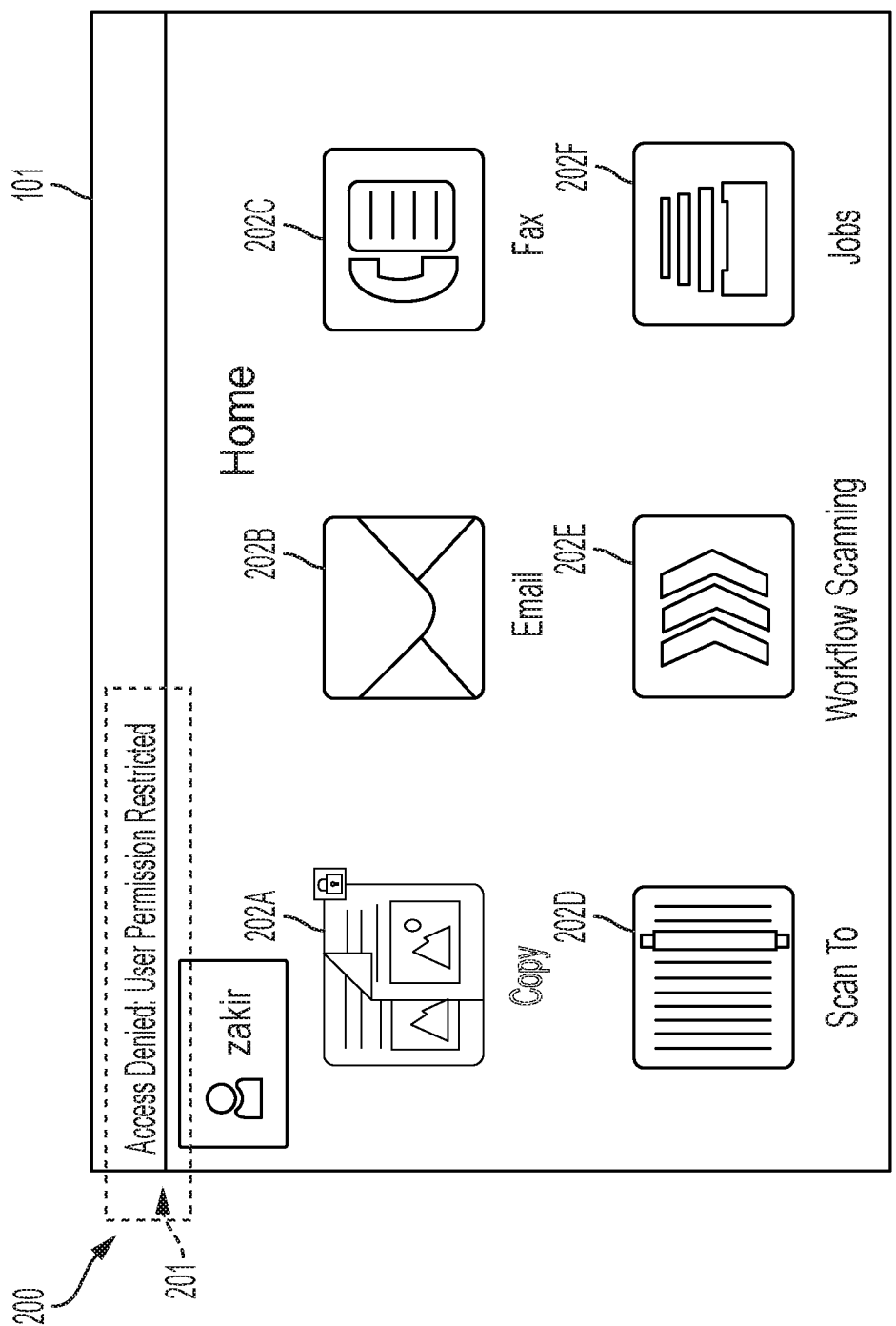
FIG. 2 illustrates an exemplary local user interface (LUI) of the multi-function device of FIG. 1A, in accordance with an embodiment of the present disclosure.

FIG. 2 illustrates an exemplary local user interface 101 of the multi-function device 100, in accordance with an embodiment of the present disclosure. As discussed with reference to FIG. 1B, the user 106 can access a number of services 202A-202F, such as copy 202A, email 202B, fax 202C, scan to 202D, workflow scanning 202E, and jobs 202F (e.g., a print job) through the local user interface 101. The local user interface 200 shows a few exemplary services but the multi-function device 100 may have more services which are not shown in the local user interface 200. The user 106 can access any of the services 202A-202F to complete his day-to-day tasks. Further, the administrator 104 can access the same local user interface 101 or the services 202A-202F when required. The user 106 and the administrator 104 can accesses the local user interface 101. While accessing any service, the user 106 may face any problem related to the service. As seen in the snapshot 200, the user 106 faces a problem while accessing a copy service 202A. In such cases, an exemplary message such as message 201 is shown to the user 106. The message 201 indicates—"Access Denied User Permission Restricted."

Figure 3A:
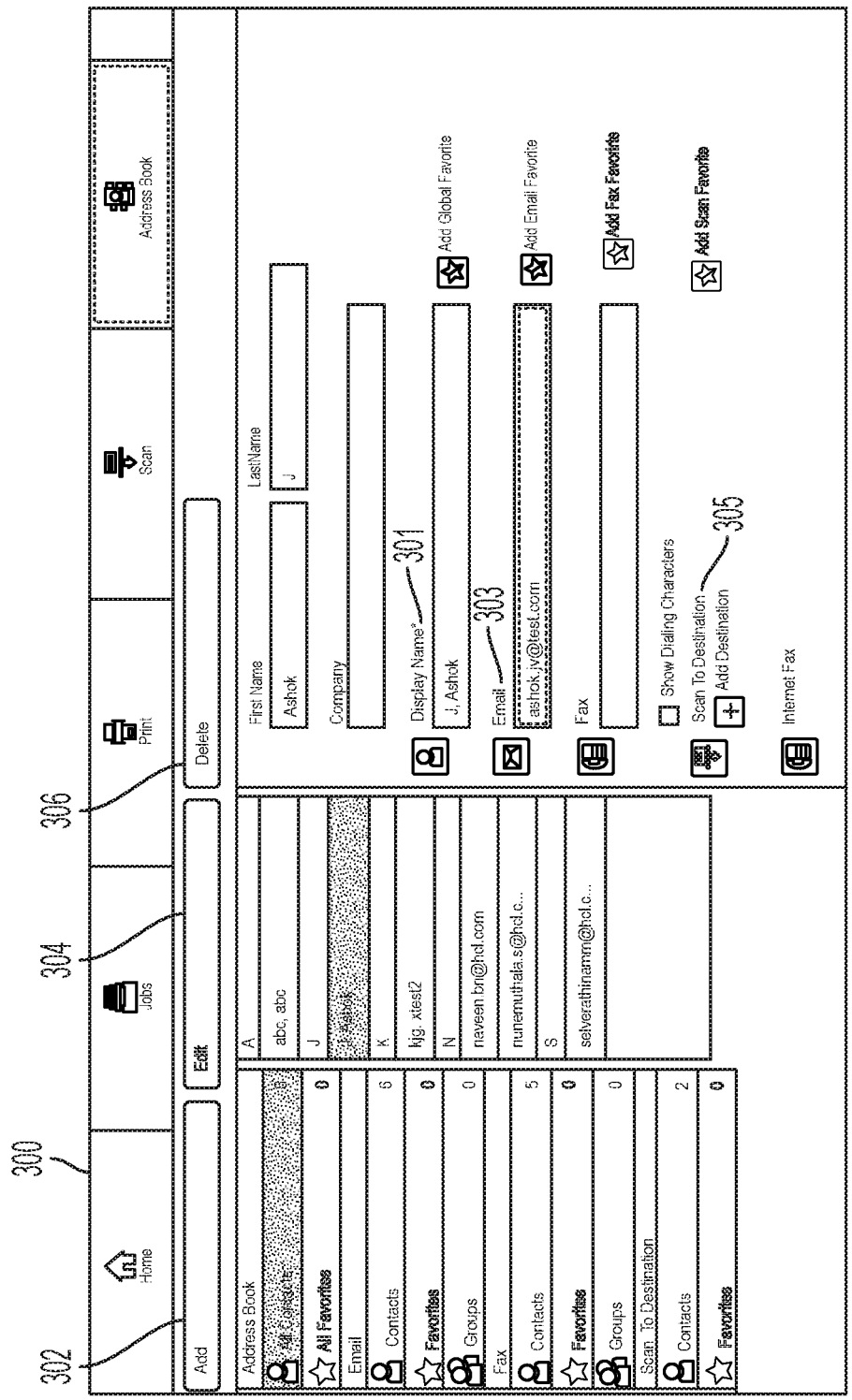
FIGS. 3A-3C illustrates exemplary webpages that are presented to the administrator on the LUI, in accordance with different embodiments of the present disclosure.
Figure 3B:
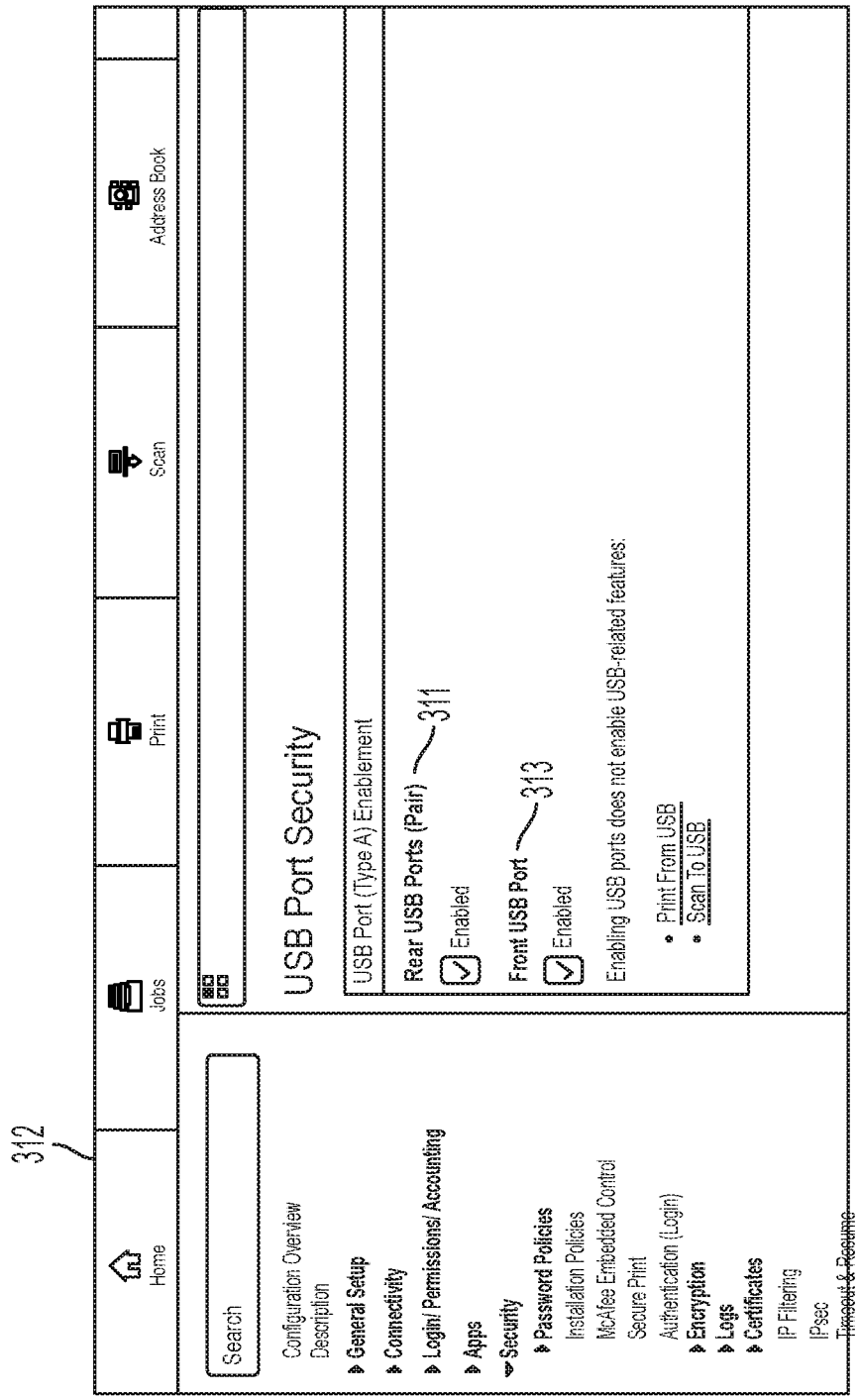
Figure 3C:

FIGS. 3A-3C illustrate exemplary snapshots of webpages of the Internet Services Program presented to the administrator 104 for providing setting inputs. As illustrated in FIG. 3A, a webpage 300 related to an address book service is shown. When the user 106 reports a problem related to the address book, the webpage 300 is displayed at the multi-function device 100. The administrator 104 can add (via option 302), delete (306) or edit (option 304) contacts or groups in the address book through the webpage 300. Exemplary settings shown on the webpage 300 are indicated as 301, 303 and 305. The administrator 104 can update settings by providing value or by enabling or disabling radio button and so on.

Another exemplary webpage 312 of the Internet Services Program that is presented to the administrator 104 is shown in FIG. 3B. The webpage 302 relates to a USB webpage and the webpage 302 is displayed when the user 106 reports a problem related to USB such as USB port is not working. The administrator 104 can provide one or more setting inputs for changing one or more settings on the webpage 312 to fix the problem. Exemplary settings shown on the webpages are indicated as 311 and 313. The administrator 104 can update settings by providing value or by enabling or disabling radio button, and so on.

An additional webpage 324 of the Internet Services Program is shown in FIG. 3C. The webpage 324 is a permission role webpage 324 and relates to updating permissions for users such as user 106. When a permission denied message is shown to the user 106 (as shown in FIG. 2), and then the multi-function device 100 retrieves and displays the permission role webpage 324 to the administrator 104. Exemplary settings shown on the webpage 324 are indicated as 321 and 323. The administrator 104 can update settings by providing value or by enabling or disabling radio button and so on. The administrator 104 can modify the permissions for the user 106, facing the problem accessing the services such as a copy service 202A as shown in FIG. 2.

The webpages snapshots shown in FIGS. 3A-3C are exemplary in nature and there can be many more examples and variations to the shown snapshots.

Exemplary System

Figure 4:
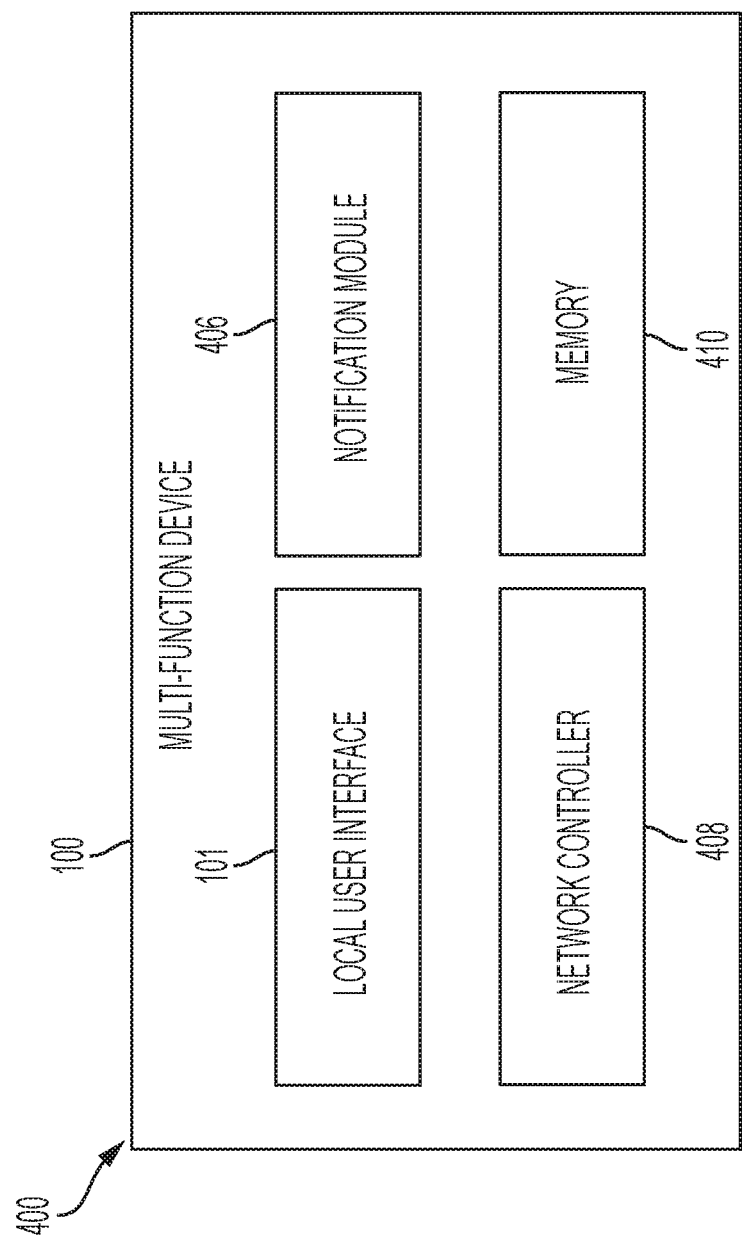
FIG. 4 is a block diagram illustrating various system components of the multi-function device of FIG. 1A, in accordance with an embodiment of the present disclosure.

FIG. 4 is a block diagram 400 illustrating various system components of an exemplary multi-function device 100, in accordance with an embodiment of the present disclosure.

The multi-function device 100 includes a local user interface 101, a notification module 406, a network controller 408, and a memory 410. The components 101, 406-410 are connected to each other via a conventional bus or later developed protocols. Each of the components 101, 406-410 communicates with each other for performing various functions of the current disclosure. The multi-function device 100 may be a multi-function device 100 used in an organization for day-to-day work of organization users. In such cases, the administrator 104 and the user 106 may be different. The multi-function device may be a multi-function device 100 used by an individual in a home environment. In such cases the administrator 104 and the user 10 may be same.

As an example, users access the multi-function device 100 for one or more services like scanning, printing, copying, workflow scanning, and so forth. The users may face problem while accessing or using the services at the multi-function device 100. In such scenarios, the users inform the administrator 104 of the multi-function device 100 to look into the problem and resolve the reported problem.

As shown, the local user interface 101 displays a number of services to the user 106 to access and complete his day-to-day tasks such as but not limited to, scanning, printing, copying, imaging, and so forth. The local user interface 101 further displays a number of webpages of the Internet Services Program. The local user interface 101 displays notifications including error messages or other notifications to users and administrator 104. The local user interface 101 provides one or more swipe options to the user. The local user interface 101 allows the administrator to access the service to validate the problem related to the service is resolved. The local user interface 101 may be a touch based interface which can be operated through one or more fingers, stylus, hand or a combination thereof. The local user interface 101 may be a keypad based interface without limiting the scope of the disclosure.

When the user 106 reports the problem, the notification module 406 sends a notification message to the administrator about the problem related to the service of the multi-function device 100. The problem may relate to an email service, a scan service, a fax service or the like. The administrator receives the notification message. The notification message may include brief information about the problem such as, email-related error, scan-related error, and so on. Alternatively, the notification message may include more details about the problem. The notification message may be in the form of at least one of a text message, an email, a video message, an audio message, or the like. The notification message may be in any format as known or later developed formats. In some implementations, the notification module 406 may send a notification message when one or more settings of the multi-function device 100 need to be updated. In case multiple problems are reported, the administrator can resolve multiple problems one-by-one in a single logged-in session at the multi-function device 100.

Upon receiving the notification message, the administrator logs in into the multi-function device 100 by providing one or more login credentials. Examples of the one or more login credentials may include, but are not limited to, a user name, a password, a pin, a name, a user ID, and so forth. In some implementations, the administrator may scan an ID card, face, finger, hand, a bar code, a quick response code, etc., for log in into the multi-function device 100. The administrator provides the one or more login credentials for accessing the local user interface 101 of the multi-function device 100. The administrator provides the login credentials at the local user interface 101 of the multi-function device 100.

The network controller 408 receives the one or more login credentials from the administrator. The network controller 408 authenticates the administrator based on the one or more login credentials to provide an access to the local user interface 101 of the multi-function device 100. Upon successful authentication, access to the multi-function device 100 or to the local user interface 101 is provided to the administrator. As a result, the administrator is able to successfully login into the multi-function device 100.

Upon successful login, the network controller 408 displays an error message screen about the reported problem to the administrator via the local user interface 101. The administrator reviews the reported problem and further provides an input at the local user interface 101. The input may be a touch-based input provided at the local user interface 101. For example, the administrator provides the input via one or more swipe options displayed on the local user interface 101. The swipe options may include an up swipe option, a down swipe option, a left swipe option, and a right swipe option. Alternatively, the input may be an audio input. The network controller 408 receives the input provided by the administrator and further authenticates the administrator into the Internet Services Program. The network controller 408 authenticates the administrator based on the one or more login credentials provided earlier by the administrator. As a result, the administrator does not require to provide login credentials again to login into the Internet Services Program, but the earlier provided login credentials are used for authenticating the administrator into the Internet Services Program. Upon successful authentication, the network controller 408 launches the Internet Services Program in the background.

Based on the input from the administrator on the local user interface 101, the network controller 408 automatically retrieves at least one relevant webpage corresponding to the reported problem. The network controller 408 retrieves the at least one relevant webpage by identifying the at least one relevant webpage corresponding to the reported problem based on one or more keywords present in the error message listing the problem. Here, the network controller 408 identifies one or more keywords from the error message screen and searches for the keywords in the plurality of stored webpages. For example, if the error message screen contains keywords such as "email," the network controller 408 searches for the keyword in the plurality of pages and identifies the at least one relevant webpage, i.e., webpages corresponding to the email service. In case a single webpage matches the reported problem, the network controller 408 retrieves a single matching webpage. In case of multiple matches, the network controller 408 automatically retrieves multiple webpages corresponding to the reported problem. This way, the network controller 408 automatically maps the problem related to the service of the multi-function device 100 onto the at least one relevant webpage of the Internet Services related in real-time based on the error message. The searching and identification process is performed by the network controller 408 in the background. Upon completion of the identification process, the network controller 408 retrieves the at least one relevant webpage from the plurality of webpages and displays the at least one relevant webpage to the administrator through/at the local user interface 101. The at least one relevant webpage is fetched according to the problem in real-time from the Internet Services Program.

The network controller 408 displays the at least one relevant webpage to the administrator via the local user interface 101.

For example, for a problem related to a user not being able to access an email service and DNS not set, the network controller 408 fetches one or more relevant webpages related to DNS not set and email problem. The network controller 408 displays the DNS Settings webpage on the local user interface 101 to enable the administrator to make necessary changes/updates on the DNS settings webpage. In another example, for a problem where contacts and/or groups need to be modified, deleted or added in an Address Book while accessing email application in the local user interface 101, the network controller 408 shows the Address Book webpage to the administrator to allow the administrator to do the necessary setting changes. In a further example, for a problem where a user is unable to scan the document successfully using a Scan Template under Workflow Scanning Application, the network controller 408 displays a settings page of the Specific Scan Template to the administrator so that the administrator can do the necessary setting changes to fix the problem. In a further example, for a problem, when a user is unable to access any services where Permission Denied Message is shown to the user, the network controller 408 displays the user permissions webpage to administrator. The administrator can modify the permissions of the user who is facing the problem accessing the services. In a further example, for a problem where a user is unable to login as a custom/convenience authentication user, the network controller 408 displays an authentication settings page to the administrator to fix the problem. In an additional example, for a problem, where alternate logon button is not available on the local user interface/screen of the multi-function device 100, the network controller 408 displays the authentication settings webpage to the administrator, where the administrator can enable the alternate login option.

Continuing with the description of FIG. 4, the administrator changes one or more settings on the at least one relevant webpage by providing one or more setting inputs on the at least one relevant webpage. The network controller 408 receives the one or more setting inputs on the at least one relevant webpage from the administrator to resolve the problem. The setting inputs may be enabling or disabling any setting via given radio buttons. The setting inputs may be any numeric value, alphabets, an alphanumeric value or any value. The setting inputs may be checking (tick) or unchecking (untick) any setting via given check boxes. The administrator then saves the one or more settings and closes the at least one relevant webpage. Upon closing the at least one relevant webpage, the administrator automatically gets logged out of the Internet Services Program. Alternatively, the administrator provides another input such as swipe input to log out from the Internet Services Program. The network controller 408 updates one or more settings on the at least one relevant webpage based on the one or more setting inputs. In a way, the network controller 408 updates the at least one relevant webpage based on the one or more setting inputs.

After updating the at least one relevant webpage, the administrator accesses the local user interface 101 to check whether the problem related to the service is resolved. Here, the administrator accesses the services and checks the functioning of the service. Once confirmed, the administrator notifies the user that the problem related to the service is fixed through one or more ways such as an email, a text message, an audio call and so on.

In case of multiple reported messages by the user, the network controller 408 allows the administrator to resolve the reported problems one by one in a single logged-in session. Once one problem is resolved, the network controller 408 displays another error message and the administrator then resolves the second problem. For example, the network controller 408 presents one or more relevant webpages related to another error message listing another problem to the administrator. The administrator then may change settings on another webpage for resolving another problem. Similarly, all the problems reported by a single user or multiple users are resolved by the administrator. This way, the administrator can resolve all the problems one by one in a single login session at the multi-function device 100.

The updated at least one relevant webpage is stored in the memory 410. The memory 410 stores configuration settings of the multi-function device 100, the login credentials/biometrics of the administrator, users detail, etc., Internet Services Program, a plurality of webpages, user permissions, services' related information, and so forth. The memory 410 stores any details related to the user, administrator, Internet Services program that are relevant for implementing the present disclosure.

In addition, the network controller 408 connects the multi-function device 100 to network and other devices in the network for example, a computing device of users, etc.

Although FIG. 4 is discussed with respect to various components of the multi-function device 100/system 400, but it is understood that functionalities of the components can be directly incorporated in the multi-function device 100. In such scenarios the multi-function device 100 resolves the problem related to a service as discussed above in detail.

Exemplary Flowchart

Figure 5A:
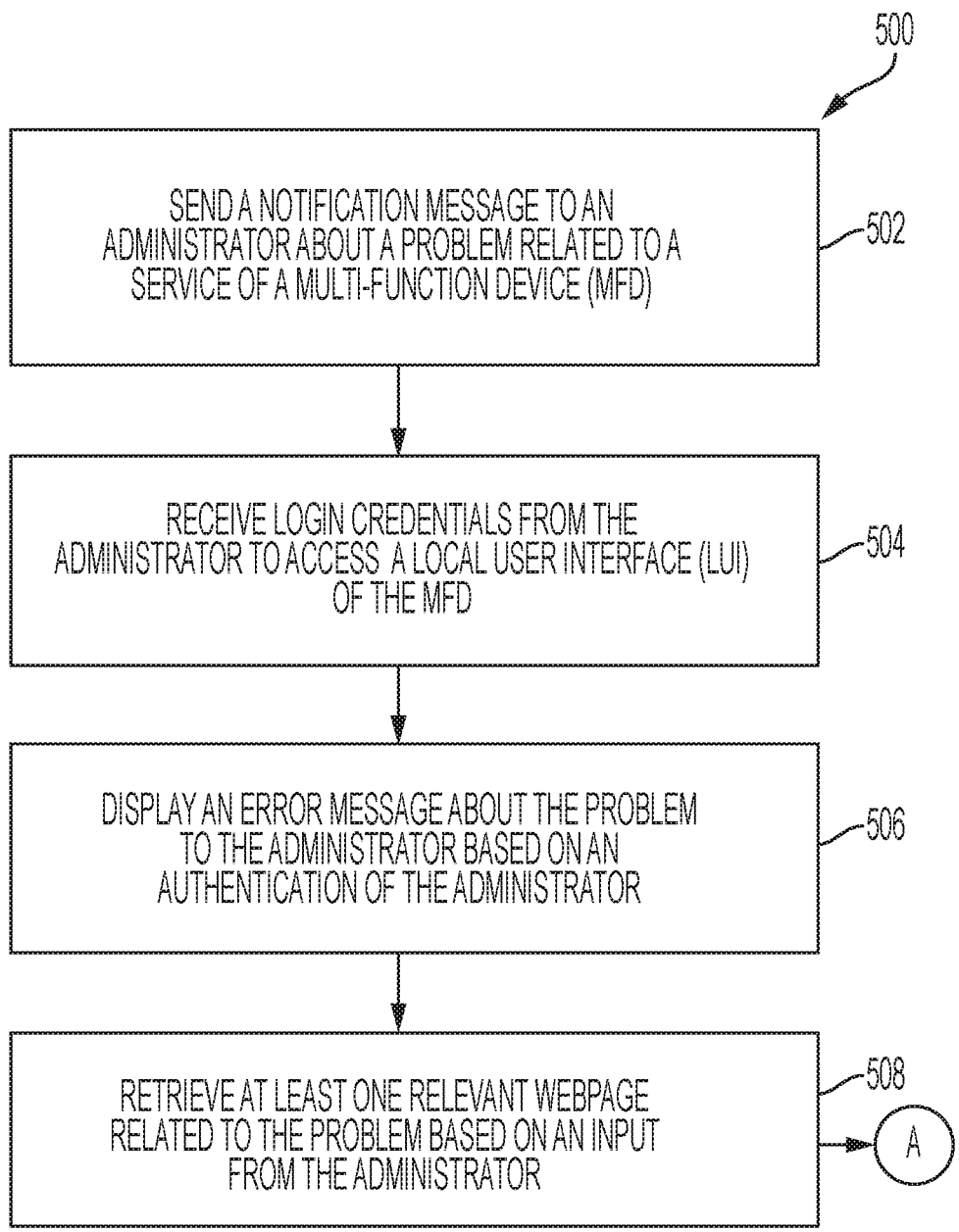
FIGS. 5A-5B represent a flowchart for enabling an administrator to resolve one or more problems related to a multi-function device, via a local user interface of the multi-function device, in accordance with an embodiment of the present disclosure.
Figure 5B:
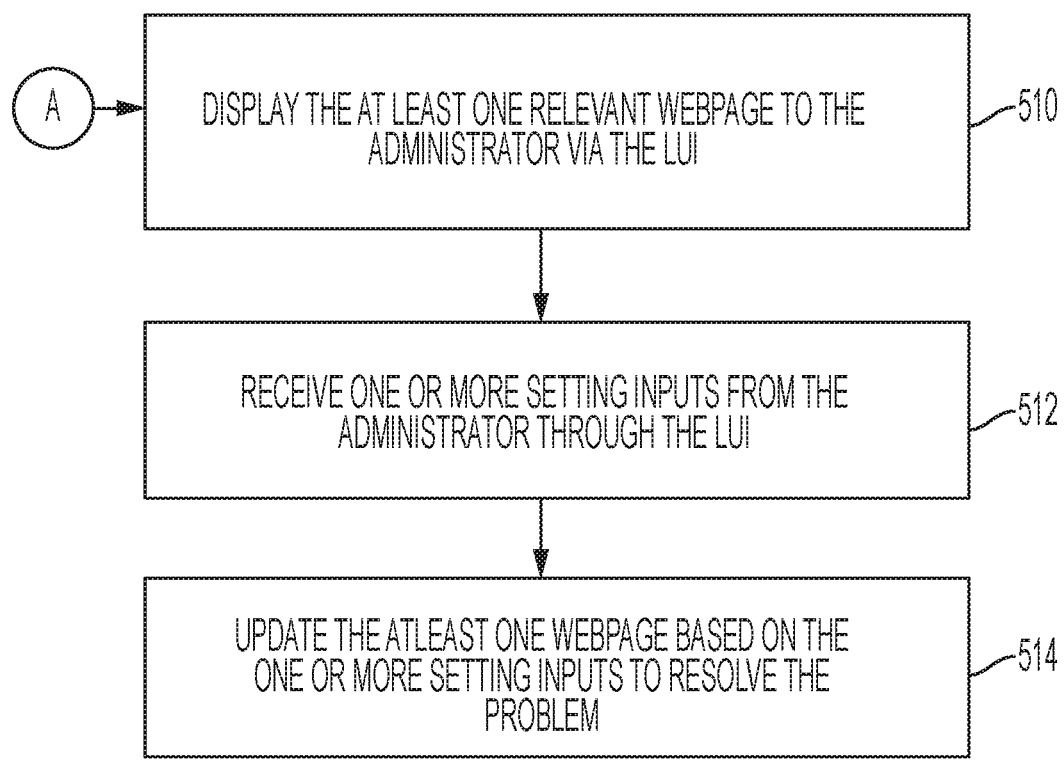

FIGS. 5A-5B represent a flowchart illustrating an exemplary method 500 for resolving one or more problems related to a service of a multi-function device. The method allows resolving the problem through a local user interface of the multi-function device. Specifically, the method 500 implements Internet Services Program at the multi-function device such that webpages specific to the problem (i.e., relevant webpages) are automatically retrieved and displayed in the local user interface of the multi-function device.

The method 500 begins with when a user uses the multi-function device for his day-to-day tasks such as email service, scan service or the like. While accessing the service, the user may face a problem related to the service. The user then reports the problem to an administrator through the local user interface of the multi-function device. This is just one way the user can report the problem to the administrator using other ways. In some implementations, the user reports the problem at the multi-function device by logging a ticket. The multi-function device then notifies the reported problem to the administrator through one or more ways such as an email, a text message, an audio message and so on.

At block 502, a notification message is sent to the administrator about the problem related to the service of the multi-function device. The administrator receives the notification message. Upon receiving the notification message, the administrator accesses the multi-function device for checking the problem. The administrator logs in into the multi-function device using one or more login credentials such as, but not limited to, a user name, a password, a pin, a card scan, biometric information or the like.

At block 504, the one or more login credentials are received from the administrator. The multi-function device receives the one or more login credentials. The administrator provides the login credentials to access the multi-function device or to access the local user interface of the multi-function device. The multi-function device authenticates the administrator as an authorized person based on the one or more login credentials. Based on the authentication, the multi-function device allows the administrator to proceed further.

At block 506, an error message about the problem is displayed to the administrator on the local user interface. The administrator reviews the error message and then provides his input to proceed further. The administrator provides the input via one or more swipe options displayed on the local user interface. Upon receiving the input, the multi-function device first authenticates the administrator into the Internet Services Program. The multi-function device authenticates the administrator based on the one or more login credentials provided before and identifies the administrator as an authorized user. Upon successful authentication, at least one webpage relevant to the reported problem is identified from the plurality of stored webpages. The identification is done by matching one or more keywords of the error message with the plurality of stored webpages of the Internet Services Program. In this manner, the at least one relevant webpage corresponding to the problem is identified.

At block 508, the at least one relevant webpage corresponding to the problem is automatically retrieved, based on the input received from the administrator. For example, for a problem where the multi-function device does not detect a USB, the multi-function device retrieves a USB Enablement page (i.e., relevant webpage). In this way, the administrator is automatically given with the at least one relevant webpage to update settings.

At block 510, the at least one relevant webpage corresponding to the problem is displayed to the administrator via the local user interface. The at least one relevant webpage is displayed using a suitable browser. The administrator provides one or more setting inputs to change or update settings of the at least one relevant webpage. The administrator provides one or more setting inputs on the at least one relevant webpage for resolving the problem.

At block 512, the one or more setting inputs are received on the at least one relevant webpage from the administrator to resolve the problem. For example, the administrator provides one or more setting inputs by changing one or more values of the settings on the USB enablement webpage so to enable the USB ports, in order to fix the problem (refer to snapshot 312 of FIG. 3B).

At block 514, the at least one relevant webpage is updated based on the one or more setting inputs received from the administrator. The at least one relevant webpage is updated such that the reported problem is resolved. Then, the administrator saves the at least one updated relevant webpage. The updated at least one relevant webpage is stored in the memory of the multi-function device.

To validate whether the problem is resolved by updating one or more settings, the administrator access the service of the multi-function device. The administrator checks whether the service is working fine and thus validation is complete.

In scenarios, when multiple problems are reported or listed in the local user interface of the multi-function device, the multi-function device allows the administrator to select each error screen one at a time and resolve the problems serially. The administrator then accesses the service(s) through the local user interface to validate whether all the problems related to the service(s) are resolved.

The method 500 allows the administrator to change settings on at the least one relevant webpage through the local user interface and further allows the administrator to validate the changes through the local user interface. As a result, the administrator does not require to switch between two different devices.

The method implements Internet Services Program through local user interface of the multi-function device, the Internet Services Program is implemented using any suitable browsers. Thus, the method brings the implementation of the browsers through the local user interface of the multi-function device.

The method 500 can be implemented in the form of a non-transitory computer-readable medium including instructions executable by a processing resource. The method blocks 502-514 and additional method blocks can be implemented in the form of a non-transitory computer readable medium including instructions executable by a processing resource. For example, a non-transitory computer-readable medium including instructions executable by a processing resource to send a notification message to the administrator about a problem related to a service of the multi-function device; receive one or more login credentials from the administrator to access the multi-function device through the local user interface; based on an authentication of the administrator, display an error message about the problem to the administrator on the local user interface; automatically retrieve at least one relevant webpage of Internet Services Program corresponding to the problem based on an input received from the administrator; display the at least one relevant webpage of the Internet Services Program to the administrator via the local user interface; receive one or more setting inputs on the at least one relevant webpage of the Internet Services Program from the administrator to resolve the problem related to the service of the multi-function device; and update the at least one relevant webpage of the Internet Services Program based on the one or more setting inputs such that the problem related to the service is resolved.

Exemplary Scenarios

Figure 6A:
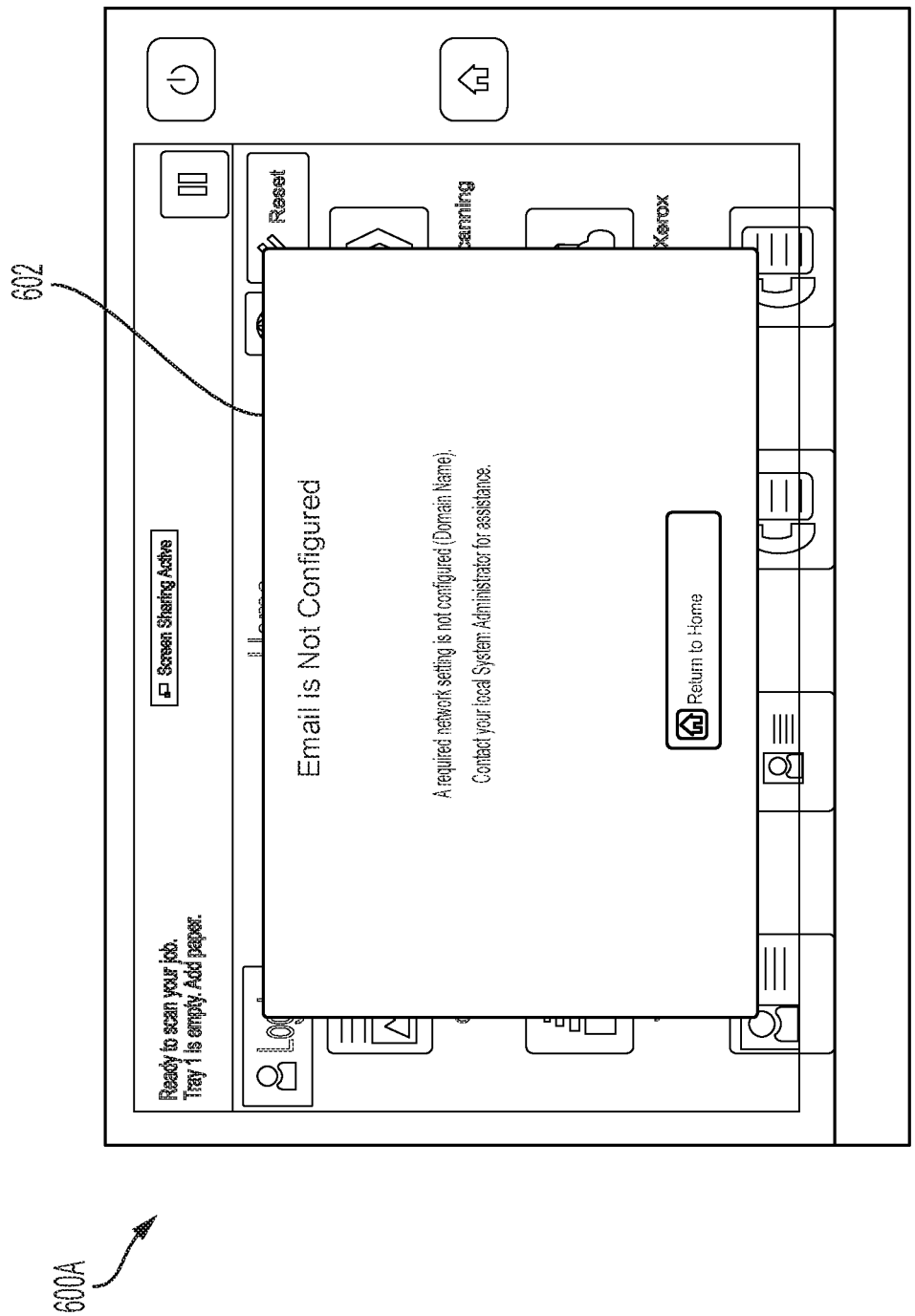
FIGS. 6A-6C show screen shots of an error message and webpages, when a user experiences a problem while accessing an email service on the multi-function device, in accordance with an embodiment of the present disclosure.
Figure 6B:
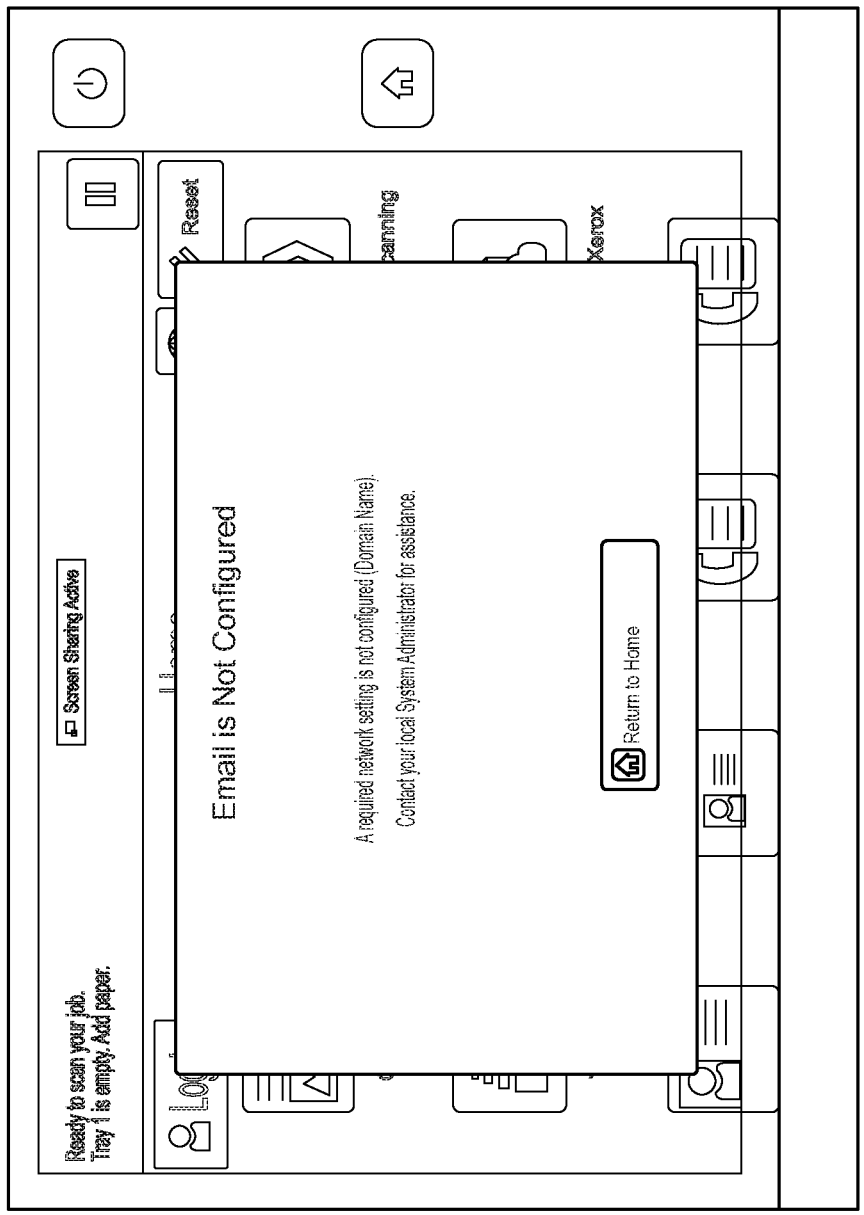
Figure 6C:
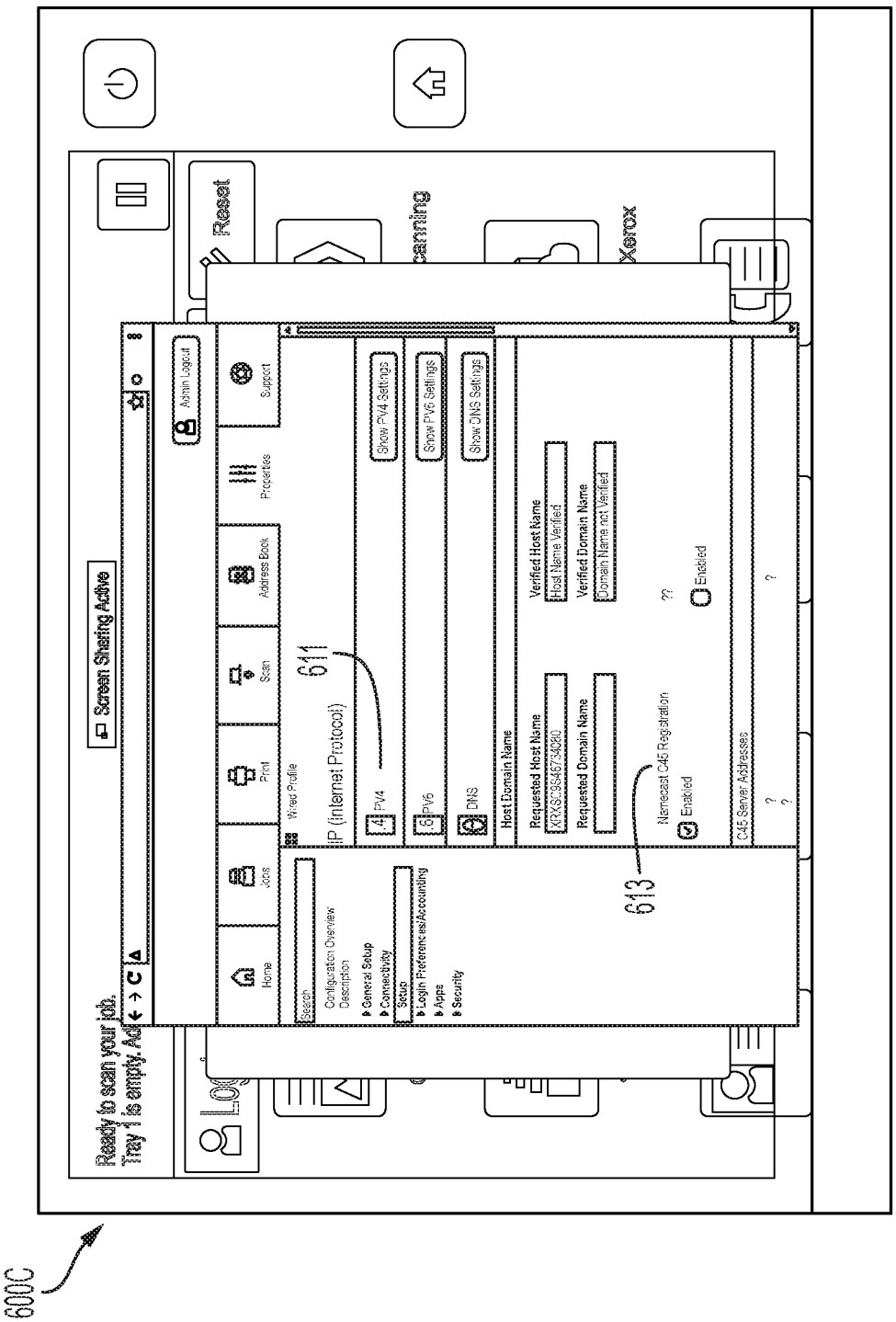

In FIGS. 6A-6C, screen shots 600A-600C of the multi-function device (MFD) when the user experiences a problem while accessing an email service on the multi-function device are shown. As shown in the screen shot 600A of the FIG. 6A, the user experiences a problem while accessing an Email on a multi-function device. The screenshot 600A shows an exemplary error message 602 displayed at the local user interface when an administrator logs-in into the multi-function device. The error message may be "Email is Not Configured" as seen in the screenshot 600A of the multi-function device. The error message 602 further outlines that "A required network setting is not configured (Domain Name)." This is just one example, the error message 602 can be any other formats.

The administrator provides an input via swipe options from any of the 4 sides as 604A, 604B, 604C, 604D as shown in the snapshot 600B of FIG. 6B.

Based on the input, the multi-function device automatically matches keywords in the reported problem with multiple webpages of the Internet Services Program and retrieves at least one relevant webpage from the Internet Services Program and displays to the administrator. For example, when the administrator swipes, the multi-function device authenticates the administrator into the Internet Services Program automatically, and the administrator may not have to provide any login credentials again for accessing webpages of the internet services program. For example, the multi-function device displays the relevant DNS Settings webpage on the screen as shown in FIG. 6C. The DNS settings webpage include various settings such as 611 and 613. The administrator checks the settings, and updates/corrects the settings and saves the settings as shown in the screen shot 600C. The administrator then swipes screen again (from in to out) to make the DNS setting webpage go away. The administrator to access the service again and sees that the problem is fixed. The administrator may check if the Email service for the user is working now from the local user interface. If the Email problem is solved, then the administrator may inform the user and log out of the multi-function device.

Various examples of the problem that the user can face include, but not limited to, i) unable to access email service—DNS not set, ii) need to modify/delete contacts/groups in address book while accessing email service in the LUI, iii) unable to scan the document successfully using a scan template under workflow scanning service, iv) unable to access any services as a user—permission denied message is shown, v) unable to login as a custom/convenience authentication user, vi) an alternate logon button is not available on screen, and vii) USB not detected. For each problem, a relevant webpage is mapped in the Internet Services Program in real-time based on the error message. For example, when the user reports that the user is unable to access email service where DNS not set. In such cases, the DNS Settings webpage is displayed to the administrator so that the administrator can provide setting inputs on the DNS settings webpage. In another example, when the address book related problem is reported by the user, an Address Book Page in Internet Services Program is displayed to the administrator, allowing the administrator to do the necessary changes. In case of specific scan template problem, a settings page of the specific scan template is shown to the administrator, so that the administrator can do the necessary changes to fix the problem. In case no service access problem is reported, then user permissions webpage in Internet Services Program is shown, where the administrator can modify the permissions of the user facing the problem. In case the user reports, unable to login as a Custom/Convenience authentication user, then an authentication settings page, is presented where the administrator can evaluate and update the settings. In case of alternate logon problem is reported, then an authentication settings page is presented, where the administrator can enable the Alternate Login option. In case of USB not detected problem, then a USB enablement webpage page is presented. The administrator can enable the USB ports.

Although the present disclosure is discussed with respect to resolving problems by accessing webpages of the Internet Services Program through the local user interface, but it is understood that the disclosure can be implemented for other scenarios. For example, the disclosure can be implemented to configure a service at a multi-function device by accessing webpages of Internet Services Program through the local user interface.

The present disclosure discloses methods and systems for enabling an administrator to resolve one or more problems related to a multi-function device, via a local user interface (LUI) of the multi-function device (MFD). The methods and systems for automatically fetches/retrieves and displays relevant webpages corresponding to the problems, at a local user interface of the multi-function device. The automatic retrieval of relevant pages is easier for troubleshooting the problems. Hence, the administrator is not required to navigate to different webpages unnecessarily to find the relevant webpages. The methods and systems enable the administrator to resolve the problems related to a service by directly providing accessing to relevant webpages of the Internet Services Program through the local user interface of the multi-function device. The administrator can change settings on the webpages of the Internet Services Program through the local user interface. This way the administrator can resolve the problems quickly as the administrator does not require to access any external device such as a computing device for updating settings or making any changes to the webpages. The methods and systems allow the administrator to access the Internet Services Program and corresponding webpages from the local user interface.

Further, a single authentication (login) enables the administrator to login into the multi-function device to access the local user interface and to access the Internet Services Program. The single login allows the administrator to change settings on the relevant webpages as well as allows the administrator to check functioning of the service at the local user interface.

The methods and systems increase productivity of walk-up users of the multi-function device.

Implementing the systems and methods of the present disclosure saves a lot of time and effort of the administrator as the administrator do not require to juggle between two different machines, i.e., personal computer and the multi-function device to update settings and further check if the service is working fine in the local user interface after saving the settings.

The present disclosure implements the Internet Service Program in the multi-function device such that an administrator is able to access the Internet Services Program and corresponding webpages for any reported problem through the local user interface.

The present disclosure brings browser to the local user interface. The present disclosure uses the already logged-in details of the administrator to allow the administrator to login into the Internet Services Program.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium.

For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "checking," or "storing," or "displaying," or "sending," or "identifying," "or receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for enabling an administrator to resolve one or more problems related to a multi-function device, via a local user interface (LUI) of the multi-function device (MFD), comprising:
   wherein the multi-function device implements an Internet Service Program through the local user interface, the Internet Services Program comprising a plurality of webpages,
   sending, by a notification module, a notification message to the administrator about a problem related to a service of the multi-function device;
   receiving, by a network controller, one or more login credentials from the administrator to access the multi-function device through the local user interface;
   based on an authentication of the administrator, displaying, by the network controller, an error message about the problem to the administrator on the local user interface;
   automatically, by the network controller, retrieving at least one relevant webpage of the Internet Services Program corresponding to the problem, based on an input received from the administrator;

displaying, by the network controller, the at least one relevant webpage of the Internet Services Program to the administrator via the local user interface;

receiving, by the network controller, one or more setting inputs on the at least one relevant webpage of the Internet Services Program from the administrator to resolve the problem related to the service of the multi-function device; and updating, by the network controller, the at least one relevant webpage of the Internet Services Program based on the one or more setting inputs such that the problem related to the service is resolved.

2. The method of claim 1, further comprising receiving the input from the administrator via one or more swipe options displayed on the local user interface.

3. The method of claim 1, further comprising storing the updated at least one relevant webpage of the Internet Services Program.

4. The method of claim 1, wherein retrieving the at least one relevant webpage of the Internet Services Program comprises identifying the at least one relevant webpage of the Internet Services Program corresponding to the problem based on one or more keywords.

5. The method of claim 1, further comprising allowing the administrator to access the service through the local user interface to validate the problem related to the service is resolved.

6. The method of claim 1, further comprising automatically map the problem related to the service of the multi-function device onto the at least one relevant webpage of the Internet Services Program.

7. The method of claim 1, further comprising storing a plurality of webpages of the Internet Services Program.

8. The method of claim 1, further comprising authenticating the administrator in the Internet Services Program before retrieving the at least one relevant webpage.

9. The method of claim 1, further comprising launching the Internet Services Program through the local user interface.

10. The method of claim 1, further comprising providing access to the Internet Services Program in the local user interface.

11. A multi-function device for enabling an administrator to resolve one or more problems related to the multi-function device, via a local user interface (LUI) of the multi-function device (MFD), comprising:

a notification module to send a notification message to the administrator about a problem related to a service of the multi-function device; and a network controller to:
receive one or more login credentials from the administrator, to access the multi-function device through the local user interface;

based on an authentication of the administrator, display an error message about the problem to the administrator on the local user interface;

automatically retrieve at least one relevant webpage corresponding to the problem based on an input received from the administrator through the local user interface;

receive one or more setting inputs on the at least one relevant webpage from the administrator to resolve the problem; and update the at least one relevant webpage based on the one or more setting inputs such that the problem is resolved; and the local user interface to display the at least one relevant webpage to the administrator, wherein the multi-function device implements Internet Services Program through the local user interface of the multi-function device.

12. The multi-function device of claim 11, wherein the local user interface provides one or more swipe options to the user.

13. The multi-function device of claim 11 further comprising a memory for storing the updated at least one relevant webpage.

14. The multi-function device of claim 11, wherein the network controller identifies the at least one relevant webpage corresponding to the problem based on one or more keywords present in the error message.

15. The multi-function device of claim 11, wherein the local user interface allows the administrator to access the service to validate the problem related to the service is resolved.

16. The multi-function device of claim 11, wherein the network controller maps the problem related to the service of the multi-function device onto the at least one relevant webpage.

17. A system comprising:
a multi-function device, to:
send a notification message to an administrator about a problem related to a service of the multi-function device;

receive one or more login credentials from the administrator, to access a local user interface (LUI) of the multi-function device;

based on an authentication of the administrator, display an error message about the problem to the administrator on the local user interface;

automatically retrieve at least one relevant webpage corresponding to the problem based on an input received from the administrator through the local user interface, wherein the administrator provides the input via one or more swipe options displayed on the local user interface;

display the at least one relevant webpage to the administrator via the local user interface;

receive one or more setting inputs on the at least one relevant webpage from the administrator to resolve the problem;

update the at least one relevant webpage based on the one or more setting inputs; and store the updated at least one relevant webpage.

18. The system of claim 17, wherein the multi-function device authenticates the administrator based on the one or more login credentials to login into the multi-function device.

19. The system of claim 17, wherein the multi-function device authenticates the administrator based on the one or more login credentials to login into Internet Services Program.

20. The system of claim 17, wherein the multi-function device maps the problem related to the service of the multi-function device onto the at least one relevant webpage.

21. The system of claim 17, wherein the at least one relevant webpage is of Internet Services Program.

22. The system of claim 17, wherein the multi-function device implements the Internet Services Program through the local user interface of the multi-function device.

* * * * *